(12) United States Patent
Quick

(10) Patent No.: US 12,637,291 B2
(45) Date of Patent: May 26, 2026

(54) FEED CHAIN CONVEYOR

(71) Applicant: Bradley S. Quick, Staatsburg, NY (US)

(72) Inventor: Bradley S. Quick, Staatsburg, NY (US)

( * ) Notice: Subject to any disclaimer, the term of this patent is extended or adjusted under 35 U.S.C. 154(b) by 157 days.

(21) Appl. No.: 18/583,081

(22) Filed: Feb. 21, 2024

(65) Prior Publication Data

US 2025/0263242 A1 Aug. 21, 2025

(51) Int. Cl.
B65G 17/38 (2006.01)
B65G 17/42 (2006.01)

(52) U.S. Cl.
CPC .................................... B65G 17/38 (2013.01)

(58) Field of Classification Search
CPC ................................ B65G 17/38; B65G 17/42
USPC ......................................................... 198/822
See application file for complete search history.

(56) References Cited

U.S. PATENT DOCUMENTS

| | | | | |
|---|---|---|---|---|
| 2,045,957 | A | | 6/1936 | Loose |
| 3,034,638 | A | | 5/1962 | Franz |
| 3,327,839 | A | | 6/1967 | Sigety et al. |
| 3,557,938 | A | * | 1/1971 | Christensen .......... F26B 25/004 118/313 |
| 4,770,291 | A | * | 9/1988 | Shaw ................... B65G 17/067 D34/29 |
| 5,042,647 | A | * | 8/1991 | Tyler ................... B65G 17/067 198/845 |

| | | | | |
|---|---|---|---|---|
| 6,478,143 | B1 | * | 11/2002 | Enomoto ............. B65G 17/067 198/841 |
| 6,860,383 | B2 | * | 3/2005 | Veit ........................ B65G 47/52 198/370.02 |
| 8,424,667 | B2 | | 4/2013 | Gonzalez et al. |
| 8,522,951 | B2 | | 9/2013 | Gonzalez et al. |
| 10,160,621 | B2 | * | 12/2018 | Turek ................... B66B 23/028 |
| 11,339,029 | B2 | * | 5/2022 | Praxmarer ............. B66B 23/10 |
| 11,459,212 | B2 | * | 10/2022 | Praxmarer ........... B66B 23/024 |
| 11,878,869 | B2 | * | 1/2024 | Hogan .................. B65G 21/22 |
| 2022/0204278 | A1 | | 6/2022 | Hogan et al. |

FOREIGN PATENT DOCUMENTS

| | | |
|---|---|---|
| CN | 2754843 Y | 2/2006 |
| CN | 103600959 A | 10/2015 |
| DE | 2720061 A1 | 11/1978 |
| JP | 3576388 B2 | 10/2004 |
| JP | 5621985 B2 | 11/2014 |
| WO | 2018/145214 A1 | 8/2018 |
| WO | 2022/113488 A1 | 6/2022 |

* cited by examiner

*Primary Examiner* — Douglas A Hess
(74) *Attorney, Agent, or Firm* — Laubscher&Fretwell PC

(57) ABSTRACT

A feed chain conveyor includes a plurality of slats having rollers on opposite ends of adjacent slats that ride on guide rails of a conveyor to deliver workpieces in a linear manner while reducing friction. The roller and guide rail arrangement ensures that workpieces are accurately delivered to a processing station. The guide rails are connected with upper sides of the conveyor frame and extend parallel to the direction of delivery of the workpieces. The rollers are configured to interact with the guide rails to allow movement of the feed chain in the delivery direction with only limited displacement in a direction orthogonal to the delivery direction.

10 Claims, 3 Drawing Sheets

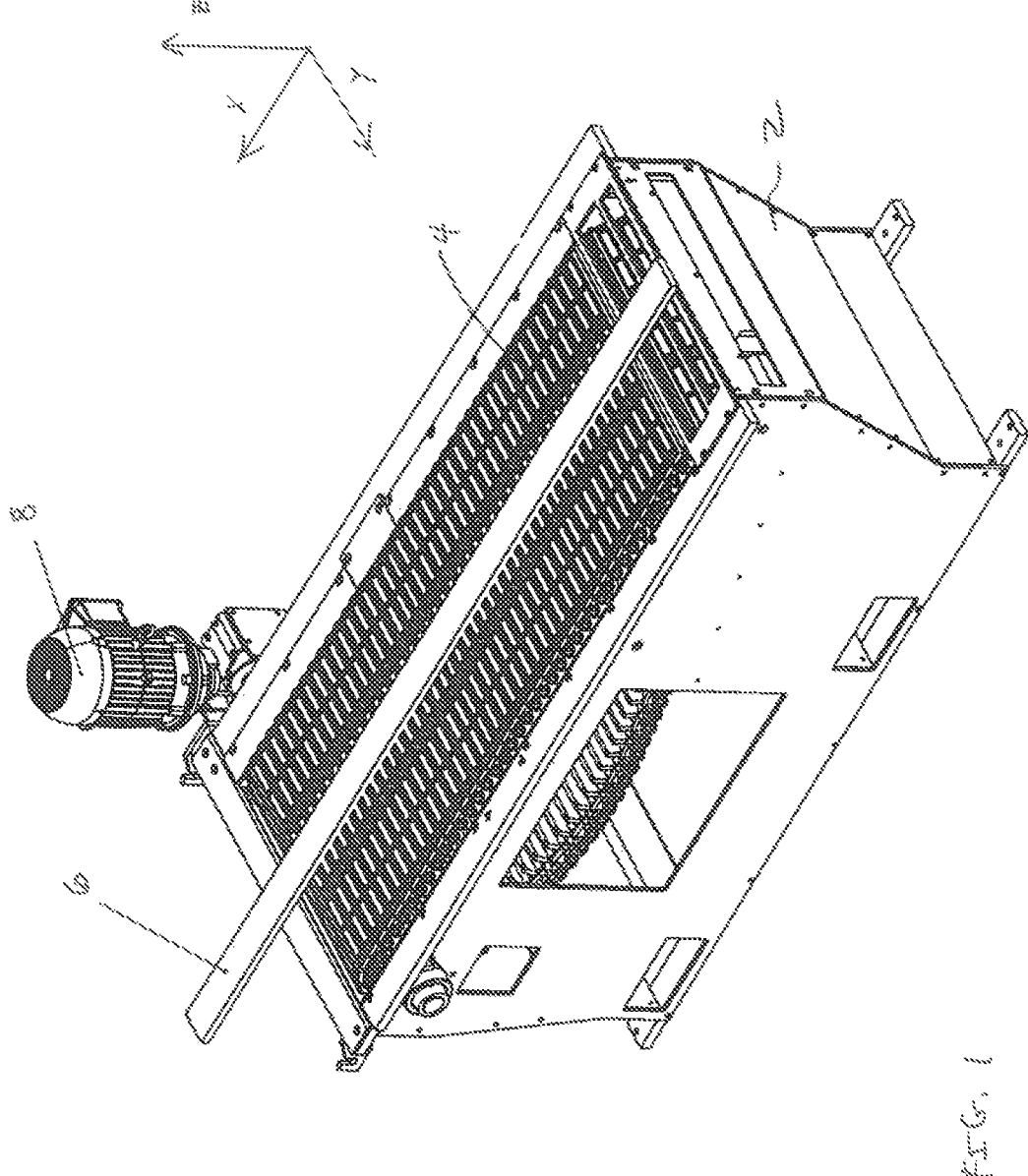

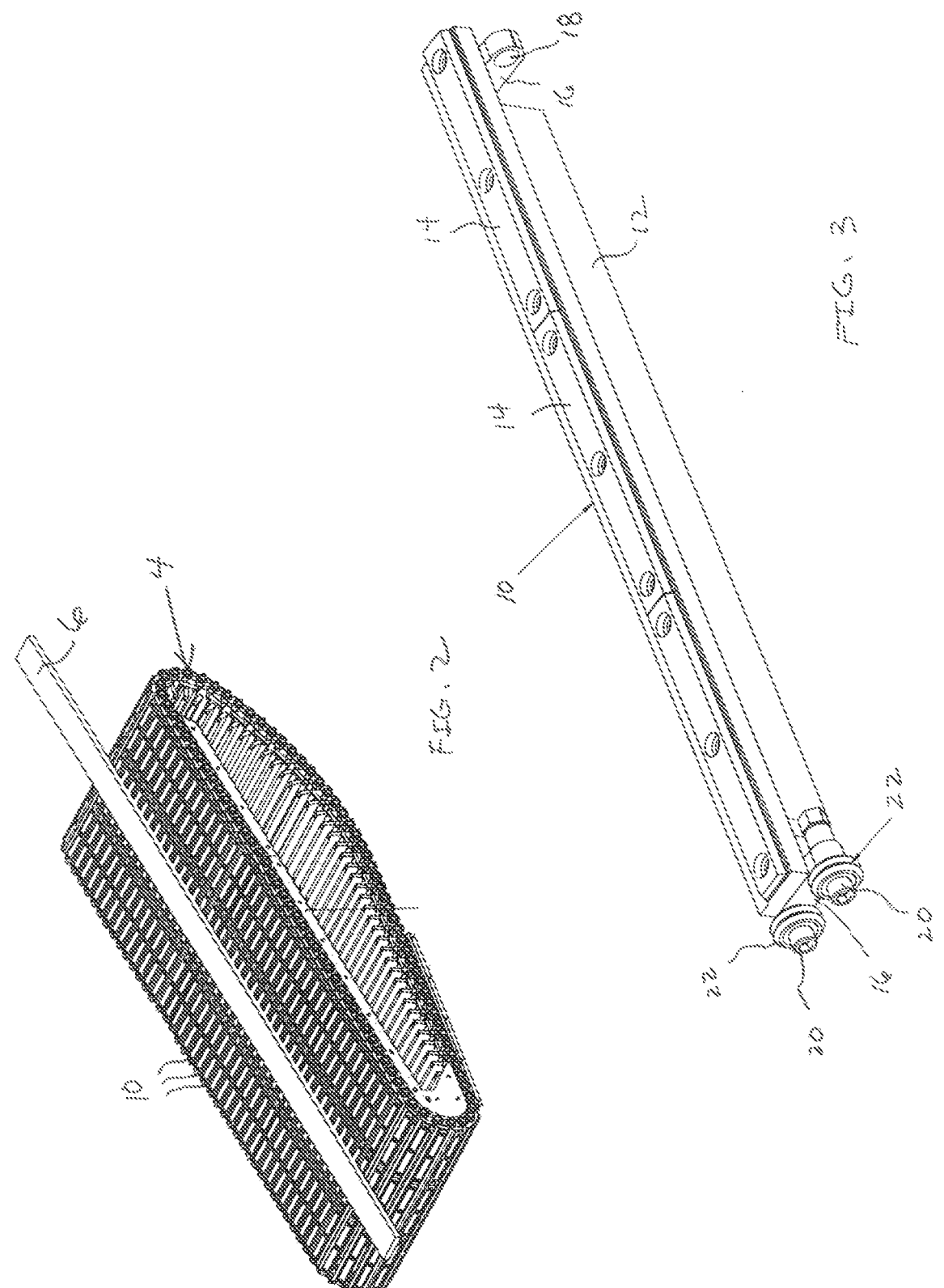

FEED CHAIN CONVEYOR

BACKGROUND OF THE INVENTION

In the production of wood products, a manufacturer typically uses a circular saw blade to cut wood planks along the grain into strips of random or predefined widths. Cutting wood in the direction of the grain is referred to as a rip cut. Several methods exist for conveying the board through the saw blades in a given direction. The method of conveyance is a critical part of the ripping process. The board must progress at constant velocity along the axis of the conveyor. Acceleration of the board or motion or vibration of the board other than in the first direction impact the quality of the cut. Contact between the conveyor and the board creates the fixture to ensure that a rip saw makes a straight cut without deep marks from the teeth of the saw blade.

BRIEF DESCRIPTION OF THE PRIOR ART

One type of conveyor for delivering a board to a saw is a feed chain in which multiple similar segments of chain link together in a continuous loop. A motor drives the feed chain, which moves the board through the saw. During the portion of the feed chain's travel that the feed chain contacts the board, the feed chain follows a linear path. A rip saw uses one or more guide rails to support the feed chain and to keep the path of the feed chain straight. Conventional feed chain/guide rail conveyors include a hardened fixed guide rail with a cast or hardened steel feed chain which slides against the rail. Such a system requires lubrication between the mating surfaces to reduce friction and extend the life of the conveyor.

Conveyors formed of slats are known in the art as shown by International patent application publication number 2022/113488. Similarly, conveyors with mating rollers and guide rails are known in the art as evidenced by the Sigety et al U.S. Pat. No. 3,327,839.

While these prior devices operate satisfactorily, they are not particularly suitable for accurately conveying heavy workpieces such as logs or boards toward a circular saw since such workpieces can induce vibrations owing to their mass or weight which leads to deficiencies in the finished products.

The present invention was developed in order to overcome the drawbacks of conventions feed chain conveyors by provided an improved guide system for a feed chain to accurately deliver large workpieces such as wood planks to a processing station such as a circular saw.

SUMMARY OF THE INVENTION

Accordingly, it is a primary object of the invention to provide a feed chain conveyor for delivering a workpiece to a processing station in a first direction including a frame having an longitudinal axis extending parallel to the first direction. At least one guide rail is connected with the frame and extends parallel to the longitudinal axis. An endless loop feed chain is connected with the guide rail. The feed chain has an upper run which supports the workpiece and a lower return run. The chain is formed of a plurality of parallel slats which are perpendicular to the longitudinal axis. The ends of adjacent slats are connected at their ends via pivot pins. At least one roller is connected with a pivot pin at one end of each slat. The roller is supported on the guide rail.

According to a preferred embodiment, a pair of spaced guide rails are connected with the frame in parallel with the frame longitudinal axis. Adjacent slats preferably have a roller connected at opposite ends so that alternating slats have rollers at one end arranged on one rail and the other alternating slats have rollers arranged on the other rail. The upper edge of each guide rail and the circumferential edge of each roller are configured to mate. Owing to the arrangement of the slats, rollers and guide rails, lateral movement of the feed chain is limited so that when the feed chain is activated, the workpiece is delivered linearly to the processing station in the first direction.

BRIEF DESCRIPTION OF THE FIGURES

Other objects and advantages of the invention will become apparent from a study of the following specification when viewed in the light of the accompanying drawing, in which:

FIG. 1 is a front perspective view of the feed chain conveyor according to the invention;

FIG. 2 is a rear perspective view of the feed chain of the conveyor shown in FIG. 1;

FIG. 3 is a perspective view of a slat of the feed chain of FIG. 2; and

DETAILED DESCRIPTION

Figure 4:
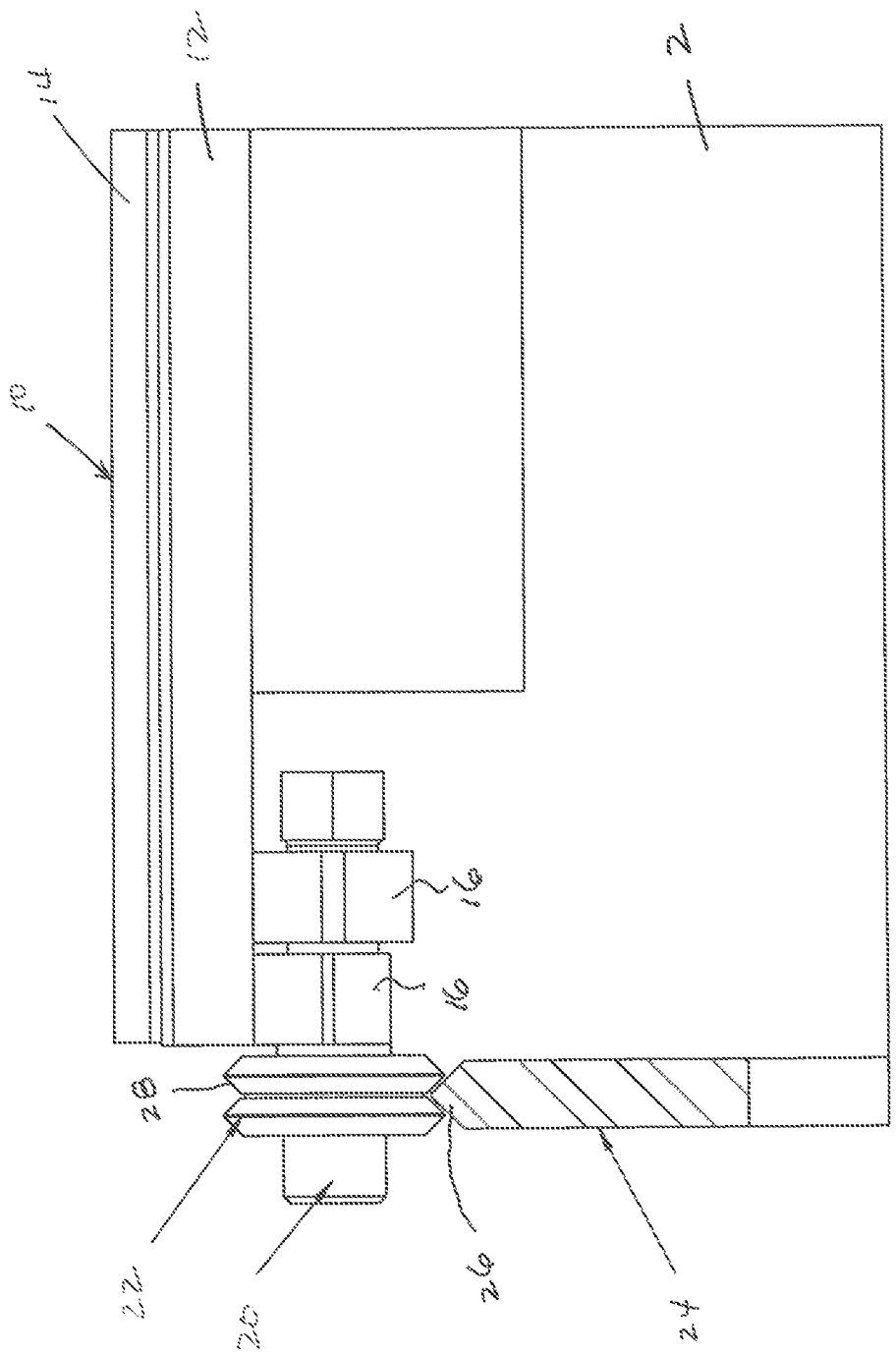
FIG. 4 is a partial sectional view of a slat of FIG. 3 mounted on a guide rail of the conveyor of FIG. 1.

The feed chain conveyor according to the invention will first be described with reference to FIG. 1. The conveyor includes a frame 2 on which a feed chain 4 is mounted. The frame has a longitudinal axis. As shown in FIG. 2, the feed chain is configured as an endless loop. The loop has an upper run which supports a workpiece 6 and a return run. A motor 8 is connected with the frame 2 to drive the feed chain relative to the frame as is known in the art. In a preferred embodiment, the workpiece is a log or wood plank that is to be cut along the grain into strips of random or predefined widths. Accordingly, the feed chain delivers the workpiece 6 in a linear x direction to a cutting station having a circular saw, not shown. The linear direction x is parallel to the longitudinal axis of the frame.

The chain is formed from a plurality of slats 10 which are arranged in parallel and extend in a y direction perpendicular to the longitudinal axis of the frame.

A single slat 10 of the feed chain 4 is shown in detail in FIG. 3. Each slat includes a base 12 and preferably one or more support pieces 14 which are connected with the base in an end to end fashion as shown. The support pieces may be removably connected with the base via fasteners (not shown) so that the support pieces may be replaced as necessary as they become worn through use. The bed and support pieces are formed of any durable rigid material such as metal, wood, or synthetic plastic.

In a preferred embodiment, a link 16 is connected with each end of each slat. The links contain a pair of through openings 18 having axes which extend parallel to the slat. A pivot pin 20 is arranged in each opening. In order to connect adjacent slats, a single pivot pin passes through aligned openings in the links at one end of adjacent slats. That is, one pivot pin connects one link opening with the link opening of an adjacent upstream slat and another pivot pin connects the same link with the link opening of an adjacent downstream slat. The link at the other end of adjacent slats are connected in the same manner.

As shown in FIG. 3, one end of a slat also includes a pair of rollers 22 which are mounted on the pivot pins in the openings of the link. While a pair of rollers are preferred, it will be appreciated that only a single roller need be provided at the end of a slat. According to a preferred embodiment, within the feed chain, a roller or pair of rollers is provided as one end of a slat but not at the other end of the slat. Rather, rollers are provided at the opposite end of an adjacent slat. That is, a first slat includes rollers only at its near end, a second slat includes rollers only at its far end, a third slat includes rollers at its near end, and so on.

The arrangement of the feed chain 4 relative to the frame 4 will be described with reference to FIG. 4. A pair of spaced parallel guide rails 24 are connected with the frame in a secure and conventional manner. The guides rails thus extend in the y direction perpendicular to the first direction x of movement of the chain to deliver the workpiece 6 to a processing station. While the guide rails are shown as being connected with the upper portion of the frame, it will be appreciated that they may be connected elsewhere with the frame so long as they are spaced and parallel to the longitudinal axis. The guide rails have a contoured upper surface which is preferably in the form of a projection 26. Each of the rollers 22 includes a contoured circumferential surface 28 configured to mate with the contour of the guide rail projection. In the embodiment shown in the drawing, the guide rail projections have an inverted V-shape and the rollers have a complementary V-shape groove. Other suitable mating contours may be provided.

The guide rails 24 define the path of the feed chain 4 while the chain is in contact with the workpiece 6 because of the interaction between the rollers 22 and the guide rails. In addition, the roller and guide rail combination reduces friction between the feed chain and the conveyor frame. The provision of rollers at opposite ends of adjacent slats in an alternating manner insures that half of the slats are guided by one rail while the other slats are guided by the opposite rail to create a rigid conveyor structure that is inexpensive and lasts longer due to reduced friction. The alternating arrangement of the rollers on adjacent slats limits motion of the feed chain in the y direction orthogonal to the motion of each slat. Less power is required to drive the feed chain and push the workpiece through a processing station. This also allows the speed of the feed chain to be increased relative to the drive speed of prior conveyor systems.

While the invention has been described with a pair of spaced guide rails for receiving rollers connected with the slats of the feed chain, it will be appreciated that other feed chain arrangements may be provided with only a single guide rail with feed chain rollers mounted thereon during movement of the upper run of the chain in the x direction. For example, mating rollers can be provided at one end of the feed chain slats to run along a contoured guide rail while other non-mating rollers may be provided at the other end of the slats to run along a flat surface. Alternatively, a guide rail may be arranged intermediate the ends of the slats, with mating rollers connected with the slats in alignment with the rail and non-mating rollers provided at one or both ends of the slats. As feed conveyors increase in width, the feed chain, rail, and roller assembly is adaptable to meet these variable dimensions while still preventing drift or movement of the feed chain laterally relative to the longitudinal axis of the conveyor frame.

While the preferred forms and embodiments of the invention have been illustrated and described, it will be apparent to those of ordinary skill in the art that various changes and modifications may be made without deviating from the inventive concepts set forth above.

What is claimed is:

1. A feed chain conveyor for delivering a workpiece to a workstation in a first direction, comprising:
   (a) a frame having a longitudinal axis extending parallel to said first direction;
   (b) a first guide rail connected with said frame defining a guided path and arranged parallel to the longitudinal axis;
   (c) a feed chain configured as an endless loop including an upper run which supports the workpiece and a lower return run, said feed chain including a plurality of rollers which engage said first guide rail in mating relation along the upper run of said feed chain, whereby when said feed chain is driven for movement relative to said frame and a workpiece is placed on the upper run of said feed chain, the workpiece is transported in the first direction while the rollers and first guide rail prevent bilateral displacement of said feed chain in directions other than the guided path.

2. A feed chain conveyor as defined in claim 1, wherein an upper edge of said first guide rail has a V-shaped configuration and an outer surface of each of said rollers have corresponding V-shaped grooves configured to receive said first guide rail for mating.

3. A feed chain conveyor as defined in claim 2, wherein said feed chain includes a plurality of parallel slats which are arranged normal to the longitudinal axis and a plurality of connecting devices which connect ends of adjacent slats, respectively, said slats having first and second ends.

4. A feed chain conveyor as defined in claim 3, wherein each slat includes at least one roller positioned to alternate between said first end and said second end of successive slats along said feed chain.

5. A feed chain conveyor as defined in claim 4, further comprising a second guide rail connected with said frame spaced from and parallel to said first guide rail, wherein each roller positioned at the first end of its respective slat is engaged with the first guide rail and each roller positioned at the second end of its respective slat is engaged with the second guide rail.

6. A feed chain conveyor as defined in claim 5, wherein a pair of rollers are connected with one of said first and second end of each slat.

7. A feed chain conveyor as defined in claim 6, and further comprising a drive mechanism connected with said feed chain.

8. A feed chain conveyor delivering a workpiece to a workstation in a first direction, comprising:
   (a) a frame having a longitudinal axis extending parallel to said first direction; and
   (b) a feed chain connected with said frame and configured as an endless loop including an upper run which supports the workpiece and a lower return run, said feed chain including a plurality of rollers, wherein the rollers are arranged along alternating sides of the feed chain such that rollers of adjacent portions of the feed chain are arranged on opposite sides of the feed chain.

9. A feed chain conveyor as defined in claim 8, wherein the feed chain further comprises a plurality of slats arranged normal to the longitudinal axis, the plurality of rollers being connected with the slats in alternating patterns along the feed chain between first and second ends of the slats.

10. A feed chain conveyor as defined in claim 9, further comprising first and second guide rails connected with said frame in spaced relation and parallel to the longitudinal axis to define a guided path, each guide rail including an upper edge having a V-shaped configuration, the rollers including V-shaped grooves to receive their respective first and second guide rails for mating to limit bilateral displacement of the feed chain in directions other than the guided path while permitting movement in the first direction.

* * * * *